(12) United States Patent
Hirata et al.

(10) Patent No.: US 6,727,952 B1
(45) Date of Patent: Apr. 27, 2004

(54) ELECTRONIC DEVICE HAVING COMMON CONNECTOR

(75) Inventors: Makoto Hirata, Higashiosaka (JP); Hideto Hayashi, Daito (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/494,356

(22) Filed: Jan. 31, 2000

(30) Foreign Application Priority Data

Feb. 2, 1999 (JP) .......................................... 11-025152

(51) Int. Cl.$^7$ .............................. G06F 1/28; G03B 7/26; H04N 5/225
(52) U.S. Cl. ................. 348/372; 348/207.1; 348/211.4; 348/552; 396/303; 713/324
(58) Field of Search ...................... 348/333.13, 14.01, 348/207.1, 207.2, 211.4, 211.12, 211.14, 372, 552; 396/301, 302, 303; 713/320, 323, 324

(56) References Cited

U.S. PATENT DOCUMENTS

| 4,782,355 | A | * | 11/1988 | Sakai et al. ................. 348/372 |
| 5,944,827 | A | * | 8/1999 | Shima et al. ................ 713/320 |
| 6,002,436 | A | * | 12/1999 | Anderson .................... 348/372 |
| 6,233,016 | B1 | * | 5/2001 | Anderson et al. ............ 348/372 |
| 6,256,682 | B1 | * | 7/2001 | Gudan et al. ................ 713/320 |
| 6,308,278 | B1 | * | 10/2001 | Khouli et al. ................ 713/323 |
| 6,460,143 | B1 | * | 10/2002 | Howard et al. ............. 713/323 |
| 6,523,124 | B1 | * | 2/2003 | Lunsford et al. ........... 713/320 |
| 2001/0003205 | A1 | * | 6/2001 | Gilbert ....................... 713/320 |
| 2001/0005641 | A1 | * | 6/2001 | Matsumoto et al. ......... 439/1 |
| 2003/0132737 | A1 | * | 7/2003 | Lin ............................ 323/282 |

FOREIGN PATENT DOCUMENTS

| JP | 03282722 A | * | 12/1991 | ............. G06F/1/32 |
| JP | 09081278 A | * | 3/1997 | ............. G06F/1/26 |
| JP | 10-117303 | | 5/1998 | |

* cited by examiner

Primary Examiner—Wendy R. Garber
Assistant Examiner—John M Villecco
(74) Attorney, Agent, or Firm—Armstrong, Kratz, Quintos, Hanson & Brooks, LLP

(57) ABSTRACT

A digital camera settable in a sleep mode including an ASIC for conducting data communication with a host computer connected to a USB connector, a microcomputer, a pull-up resistor connected to one of a pair of data lines, and a power source circuit. The camera further includes a power source input terminal connectable to a power source output terminal on the host computer, and an on/off switch for turning on/off the power to be supplied to the pull-up resistor. The microcomputer holds the on/off switch off when the camera is set in the sleep mode, while cancelling the sleep mode and turning on the on/off switch upon detecting the connection of the power source output terminal to the power source input terminal. This achieves a greater reduction in power consumption than conventionally, while rendering the camera adapted for a hot plug function even in the sleep mode.

6 Claims, 3 Drawing Sheets

ELECTRONIC DEVICE HAVING COMMON CONNECTOR

FIELD OF THE INVENTION

The present invention relates to electronic devices having a common connector such as a USB (Universal Series Bus) connector which is adapted to connect the device commonly to a plurality peripheral devices.

BACKGROUND OF THE INVENTION

In digital cameras, the image data obtained by a CCD or like image pickup device is recorded in a memory medium such as DRAM or IC card. When the image output terminal of the camera is connected to a host computer (personal computer), the image data stored in the memory medium can be transferred, for example, to a hard disk drive device.

The digital camera includes as its power source a primary battery or secondary battery, which supplies power for operating circuits when the camera is carried for use. Further digital cameras are known which are settable in a sleep mode (energy saving mode) in which the data processing function is inactivated although the control function is activated in preparation for photo-graphing so as to minimize battery power consumption.

For use as common interface means for connecting a plurality of peripheral devices such as a mouse, keyboard and printer to a personal computer, a USB (Universal Serial Bus) system is used in the field of personal computers in place of interfaces conventionally provided individually for the devices. When the main body of the computer is provided with one USB connector, up to a maximum of 127 peripheral devices can be connected in the form of a star network to the computer body.

Accordingly, investigation is under way on the use of the USB connector for digital cameras for connecting the camera to a host computer by the connector. In this case, it appears useful to realize a hot plug function, such that even when the digital camera is connected in an operating state to the USB connector, the host computer can recognize the digital camera by automatic configuration.

FIG. 3 shows a hot plug-adapted digital camera 10 having a USB connector and a host computer 2 as interconnected by the USB connector. The host computer 2 has four terminals providing the USB connector, i.e., a D+ terminal 21 and D− terminal 22 serving as a pair of positive and negative data input-output terminals, a power source output terminal 23 for supplying power to peripheral devices having no power source, and a grounding terminal 24.

On the other hand, the digital camera 10 has a D+ terminal 11 and D− terminal 12 to be connected respectively to the D+ terminal 21 and D− terminal 22. A pair of positive and negative lines, i.e., a D+ line 41 and D− line 42 extending from these terminals 11, 12, are connected to an ASIC (Application Specific Integrated Circuit) 4 for performing various data processing operations. Also connected to the ASIC 4 is a microcomputer 30 for controlling the operation of the ASIC 4 and other circuits.

The digital camera 10 incorporates a power source circuit 5 which comprises a secondary battery and which supplies required power to the microcomputer 30 and the ASIC 4 through a power source line 6. Further connected to the D+ line 41 is a pull-up resistor 8, to which power is supplied also from the power source circuit 5. The digital camera 10, which has the power source incorporated therein, need not be connected to the power source output terminal 23 of the host computer 2 for the supply of power.

When connected to the digital camera 10 by the USB connector, the host computer 2 recognizes the connection by detecting the potential difference ΔV between the D+ terminal 21 and the D− terminal 22, thus realizing a hot plug function.

In the sleep mode, power is supplied to the microcomputer 30, whereas the ASIC 4 is not energized to thereby save the power to be consumed. However, for the host computer 2 to recognize the digital camera 10 when the computer 2 is connected by the USB connector to the camera 10 as set in the sleep mode, the pull-up resistor 8 needs to be held energized at all times. This results in a problem of failing to achieve a sufficient reduction of power consumption owing to the power consumed by the pull-up resistor 8 although the camera 10 is set in the sleep mode.

Another problem encountered is that the digital camera 10 set in the sleep mode is unable to receive data from the host computer 2 because the ASIC 4 is held unenergized in this mode.

SUMMARY OF THE INVENTION

Accordingly, an object of the present invention is to provide an electronic device which has diminished power consumption and which is adapted for the hot plug function even in the sleep mode.

The present invention provides an electronic device having a common connector capable of connecting a plurality of peripheral devices commonly to the electronic device and comprising a data processing circuit for performing a specified function by conducting data communication with an information processing device connected to the common connector, a control circuit for controlling the operation of the data processing circuit, means for providing a predetermined potential difference between a pair of positive and negative data lines interconnecting the data processing circuit and the common connector, and a power source circuit for supplying power to the data processing circuit, the control circuit and the potential difference providing means, the electronic device being settable in a sleep mode in which required power is supplied from the power source circuit to the control circuit, and the function of the data processing circuit is partly or entirely inactivated by limiting the supply of power to the data processing circuit.

The electronic device of the invention further comprises a power source input terminal connectable to a power source output terminal provided on the information processing device, means for detecting the connection of the power source output terminal to the power source input terminal, and on/off means for turning on/off the power to be supplied from the power source circuit to the potential difference providing means, the control circuit being operable to hold the on/off means off during a period in which the electronic device is set in the sleep mode, while cancelling the sleep mode and turning on the on/off means upon the connection detecting means detecting the connection.

The potential difference providing means can be provided by a pull-up resistor connected to at least one of the pair of positive and negative data lines interconnecting the data processing circuit and the common connector.

Stated more specifically, the common connector is a USB connector comprising a pair of positive and negative data input-output terminals, and the pull-up resistor is connected to the positive data line which extends from the positive data input-output terminal. The connection detecting means can be provided by connecting the power source input terminal to the control circuit via an inverting circuit.

When the electronic device of the invention is in the sleep mode, the on/off means is held off to prevent the power consumption by the potential difference providing means (pull-up resistor). If the information processing device is connected to the electronic device in this state by the common connector, the connection is detected, for example, by detecting the voltage applied from the power source output terminal on the information processing device to the power source input terminal of the electronic device, and the result of detection is given to the control circuit. The control circuit thereby recognizes the connection of the information processing device to cancel the sleep mode and turn on the on/off means.

Consequently, power is supplied to the potential difference providing means (pull-up resistor), enabling the information processing device to recognize the connection of the electronic device thereto by detecting the potential difference between the pair of positive and negative data lines.

The electronic device equipped with the common connector and embodying the invention attains a greater reduction in power consumption than conventional devices because the potential difference providing means (pull-up resistor) is not energized when the device is in the sleep mode. Further the present device is adapted for the hot plug function because the device, if set in the sleep mode, can be automatically brought out of this mode by the connection of the information processing device.

DETAILED DESCRIPTION OF THE PREFERRED EMBODIMENT

Figure 1:
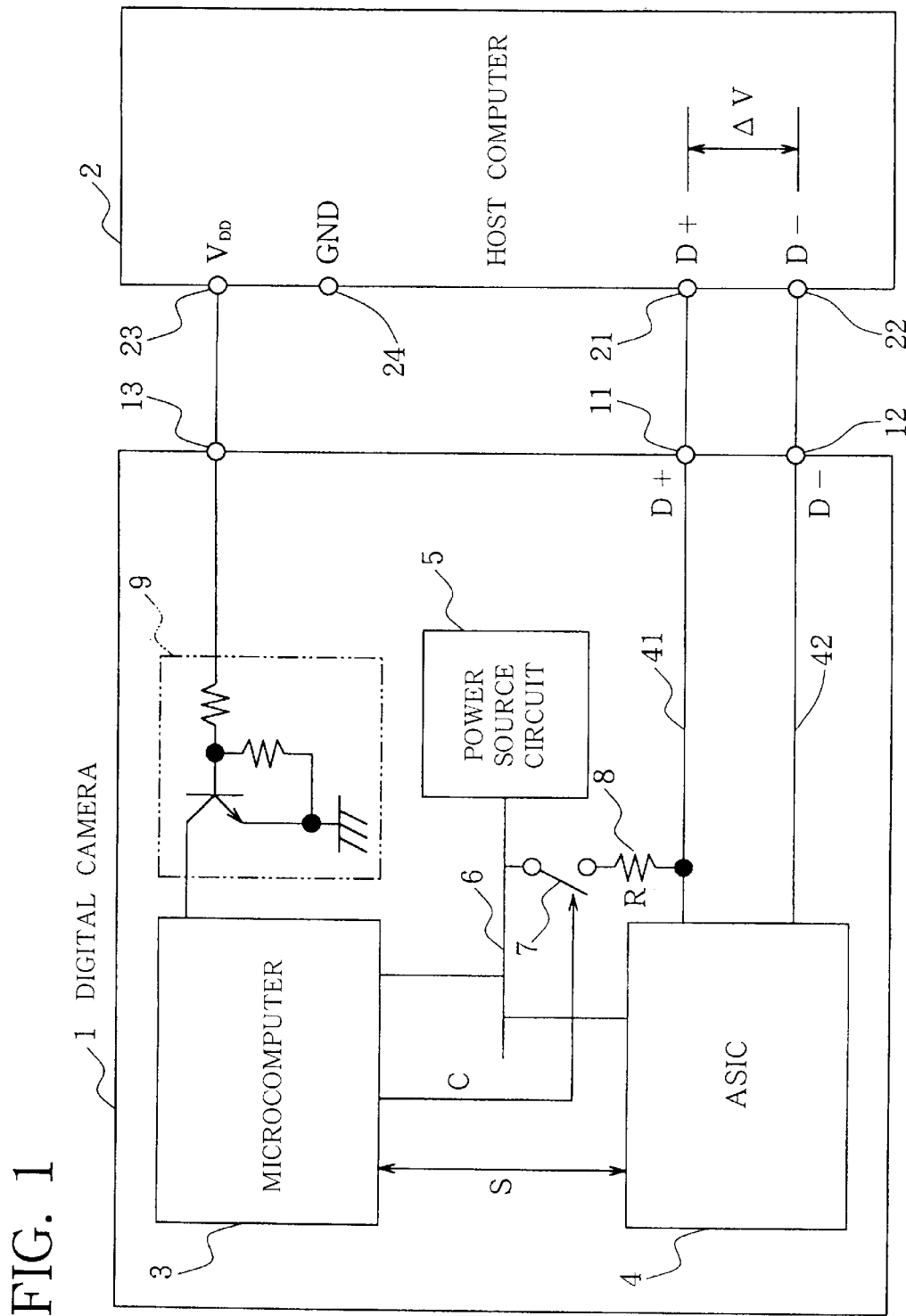
FIG. 1 is a block diagram showing a digital camera embodying the invention and a host computer as connected to each other.

A digital camera embodying the present invention will be described below in detail with reference to the drawings. FIG. 1 shows a hot plug-adapted digital camera 1 having a USB connector and embodying the invention, and a host computer 2 which are connected to each other by the USB connector.

The host computer 2 has four terminals providing the USB connector, i.e., a D+ terminal 21 and D− terminal 22 serving as a pair of positive and negative data input-output terminals, a power source output terminal 23 for supplying power to peripheral devices having no power source, and a grounding terminal 24.

On the other hand, the digital camera 1 has a D+ terminal 11 and D− terminal 12 which are to be connected respectively to the D+ terminal 21 and D− terminal 22 of the host computer 2, and a power source input terminal 13 to be connected to the power source output terminal 23 of the host computer 2. A pair of positive and negative lines, i.e., a D+ line 41 and D− line 42 extending from the D+ terminal 11 and the D− terminal 12, are connected to an ASIC 4 for performing various data processing operations. The power source input terminal 13 is connected to a microcomputer 3 via an inverting circuit 9. The microcomputer 3 is connected to the ASIC 4 and controls the operation of the ASIC 4 with a control signal S.

The digital camera 1 has a power source circuit 5 which comprises a secondary cell or battery and which supplies required power to the microcomputer 3 and the ASIC 4 through a power source line 6. Further connected to the D+ line 41 is a pull-up resistor 8, to which power is supplied from the power source circuit 5 by way of an on/off switch 7. The switch 7 is on/off-controlled with an on/off control signal C from the microcomputer 3.

When connected to the digital camera 1 by the USB connector, the host computer 2 recognizes the connection by detecting the potential difference ΔV between the D+ terminal 21 and the D− terminal 22, whereby a hot plug function can be realized.

With the digital camera 1 set in a sleep mode, power is supplied to the microcomputer 3 from the power source circuit 5, whereas the power supply from the circuit 5 to the ASIC 4 is discontinued, and the on/off switch 7 is off to block the power supply to the pull-up resistor 8 to thereby save the power to be consumed.

While the host computer 2 is held disconnected from the digital camera 1, the output signal of the inverting circuit 9 of the camera 1 is high.

When the host computer 2 is connected by the USB connector to the digital camera 1 as set in the sleep mode, the power source voltage delivered from the power source output terminal 23 of the host computer 2 is applied to the power input terminal 13 of the camera 1, whereby the output signal of the inverting circuit 9 is inverted from high to low, and the low signal is fed to the microcomputer 3. Consequently the microcomputer 3 detects the connection of the host computer 2 to the camera 1.

In response to the detection, the microcomputer 3 brings the camera 1 out of the sleep mode and gives the on/off switch 7 a command to close. As a result, the switch 7 is turned on, causing the power source circuit 5 to supply power to the pull-up resistor 8 and enabling the host computer 2 to detect the potential difference between the D+ terminal 21 and the D− terminal 22 and thereby recognize the digital camera 1 as connected thereto.

Figure 2:
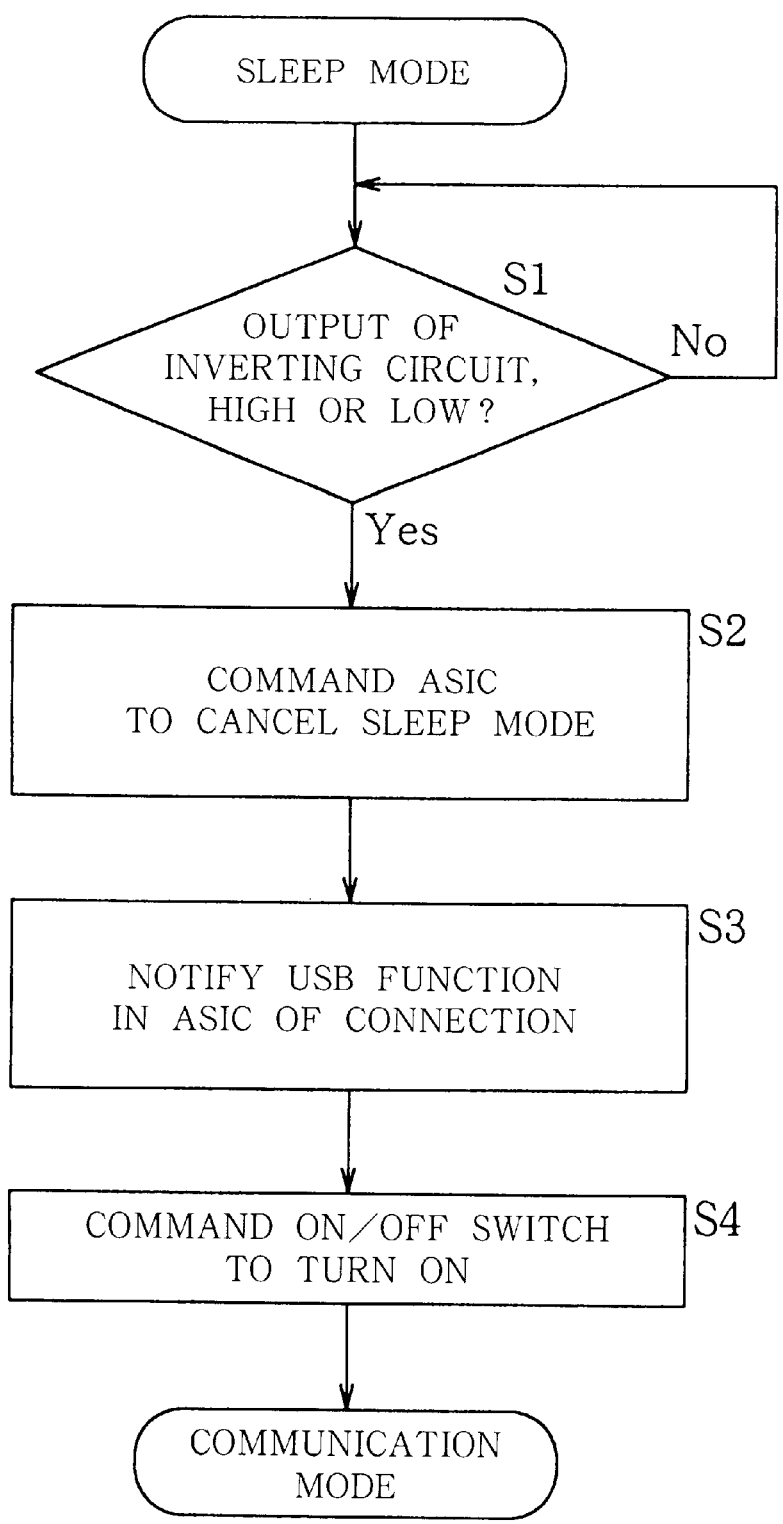
FIG. 2 is a flow chart showing the operation of the digital camera of the invention.
Figure 3:
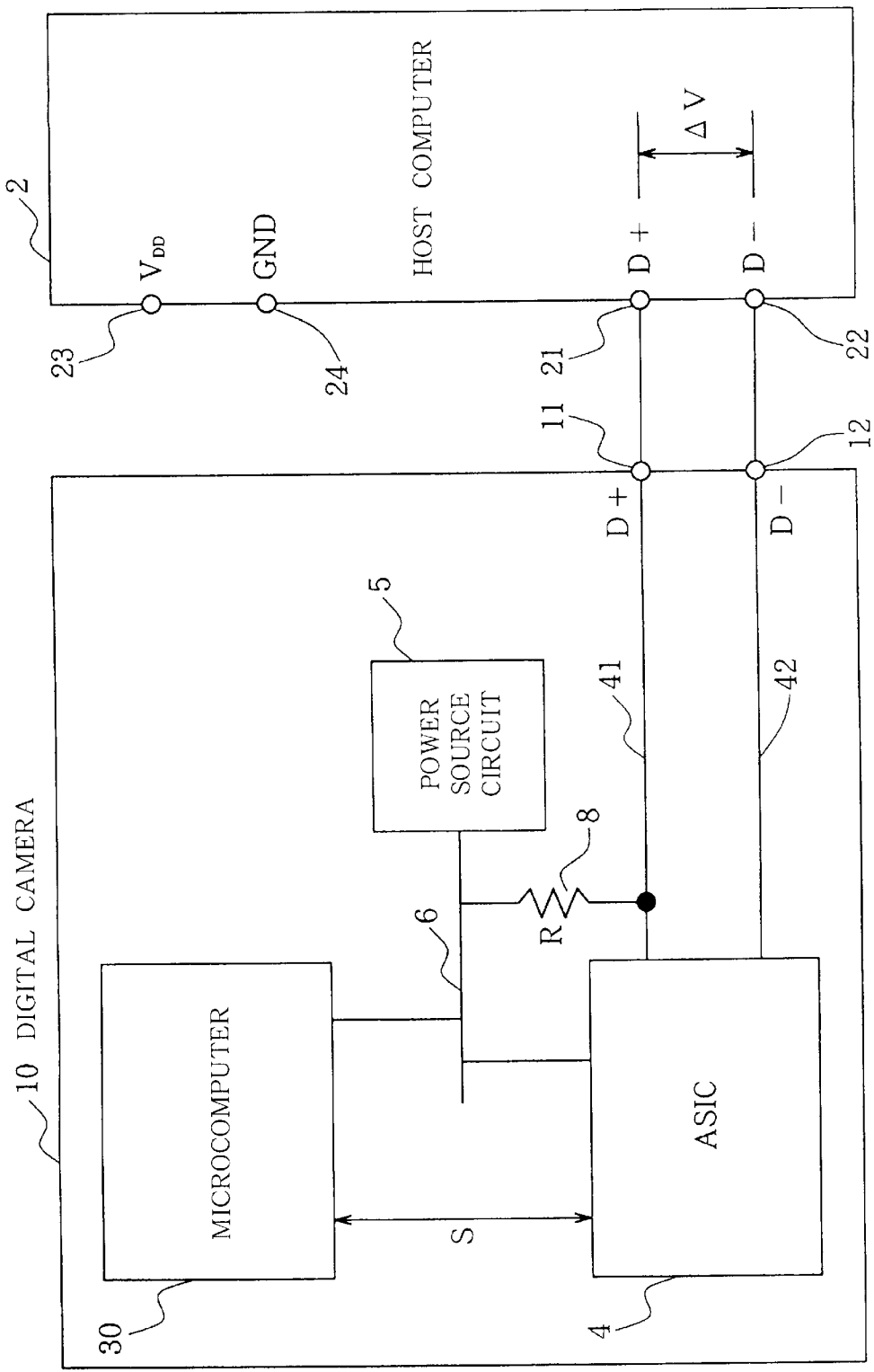
FIG. 3 is a block diagram showing a conventional digital camera and a host computer as connected to each other.

FIG. 2 shows the operation of the microcomputer 3 when the host computer 2 is connected by the USB connector to the digital camera 1 as set in the sleep mode.

First in step S1, the microcomputer 3 checks whether the output signal from the inverting circuit 9 is inverted from high to low to judge whether the host computer 2 is connected to the camera 1. If the connection of the host computer 2 is detected, the ASIC 4 is given a command to cancel the sleep mode in step S2, whereby power is supplied to the ASIC 4. The USB function in the ASIC 4 is notified of the connection of the host computer 2 in the next step S3 and is thereby activated. Subsequently in step S4, the on/off switch 7 is given a command to turn on. In response to this, the host computer 2 detects the connection of the digital camera 1 thereto, whereupon communication is initiated between the camera 1 and the host computer 2.

While steps S2, S3 and S4 are control steps to be performed by the microcomputer 3, step S4 should not precede steps S2 and S3. The reason is that since the host computer 2 detects the connection of the camera and transmits data when step S4 is executed, the ASIC 4 is unable to receive the data unless steps S2 and S3 are performed.

The digital camera 1 embodying the present invention attains a greater reduction in power consumption than conventionally because the ASIC 4 is deenergized and the pull-up resistor 8 is also deenergized by setting the camera in the sleep mode as described above. Further, when the host computer 2 is connected to the digital camera 1 in the sleep mode, the microcomputer 3 detects the connection, automatically cancelling the sleep mode and starting the supply of power to the pull-up resistor 8. Consequently, the host computer 2 detects the potential difference ΔV between the D+ terminal 21 and the D− terminal 22 to thereby recognize the connection of the camera 1.

The device of the invention is not limited to the foregoing embodiment in construction but can be modified variously without departing from the spirit of the invention as set forth in the appended claims. For example, the pull-up resistor 8, which is connected to the D+ line 41 of the digital camera 1 as shown in FIG. 1, can alternatively be connected to the D− terminal 12. The digital camera 1 as connected to the host computer 2 can be recognized by the computer 2 by detecting the potential difference ΔV between the D+ terminal 21 and the D− terminal 22 also in this case. The USB system is adapted to transfer data at two different speeds, i.e., in a full-speed mode and a low-speed mode, such that an electronic device, such as a digital camera, which is high in data transfer speed is set in the full-speed mode with the pull-up resistor 8 connected to the D+ line 41, while an electronic device which is low in data transfer speed is set in the low-speed mode with the pull-up resistor 8 connected to the D− terminal 12. Accordingly, when the present invention is to be applied to electronic devices which are low in data transfer speed, the pull-up resistor 8 is connected to the D− terminal 12.

The present invention can be practiced not only for digital cameras but also for a wide variety of portable electronic devices having a common connector and given a hot plug function. The common connector is not limited to a USB connector but can be a common connector according to other standards.

What is claimed is:

1. An electronic device having a common connector capable of connecting a plurality of peripheral devices commonly to the electronic device, the electronic device comprising:

a data processing circuit for performing a specified function by conducting data communication with an information processing device connected to the common connector:

a control circuit for controlling the operation of the data processing circuit:

means for providing a predetermined potential difference between a pair of positive and negative data lines interconnecting the data processing circuit and the common connector: and a power source circuit for supplying power to the data processing circuit, the control circuit and the potential difference providing means, wherein the electronic device is settable in a sleep mode in which required power is supplied from the power source circuit to the control circuit, and the function of the data processing circuit is partly or entirely inactivated by limiting the supply of power to the data processing circuit, wherein the electronic device further comprises:

a power source input terminal connectable to a power source output terminal provided on the information processing device;

means for detecting the connection of the power source output terminal to the power source input terminal; and on/off means for turning on/off the power to be supplied from the power source circuit to the potential difference providing means, wherein the control circuit being is operable to hold the on/off means off during a period in which the electronic device is set in the sleep mode, while cancelling the sleep mode and turning on the on/off means upon the connection detecting means detecting the connection.

2. An electronic device according to claim 1, wherein when the power source output terminal is connected, the control circuit gives the data processing circuit a command to cancel the sleep mode, notifies the data processing circuit of the connection of the power source output terminal, and thereafter gives the on/off means a command to turn on.

3. An electronic device according to claim 1, wherein the potential difference providing means comprises a pull-up resistor connected to at least one of the pair of positive and negative data lines interconnecting the data processing circuit and the common connector.

4. An electronic device according to claim 3, wherein the common connector is a USB connector comprising a air of positive and negative data input-output terminals, and the pull-up resistor is connected to the positive data line extending from the positive data input-output terminal or to the negative data line extending from the negative data input-output line.

5. An electronic device according to claim 1, wherein the connection detecting means is provided by connecting the power source input terminal to the control circuit via an inverting circuit.

6. An electronic device according to claim 1, wherein the power source circuit comprises a primary or secondary cell or battery and which has a portable body.

* * * * *

UNITED STATES PATENT AND TRADEMARK OFFICE
CERTIFICATE OF CORRECTION

PATENT NO. : 6,727,952 B1
DATED : April 27, 2004
INVENTOR(S) : Hirata et al.

It is certified that error appears in the above-identified patent and that said Letters Patent is hereby corrected as shown below:

Column 5,
Lines 43 and 49, change "connector:" to be -- connector; --
Line 45, change "circuit:" to be -- circuit; --

Column 6,
Line 19, change "circuit being is" to be -- circuit is --
Line 36, change "a air of" to be -- a pair of --

Signed and Sealed this

Ninth Day of November, 2004

JON W. DUDAS
*Director of the United States Patent and Trademark Office*